March 14, 1961  H. K. KIENZLE  2,974,734
IMPLEMENT CONTROL SYSTEM
Filed July 8, 1957  7 Sheets-Sheet 1

INVENTOR.
H. K. KIENZLE

FIG. 5

INVENTOR.
H. K. KIENZLE

INVENTOR.
H. K. KIENZLE

March 14, 1961  H. K. KIENZLE  2,974,734
IMPLEMENT CONTROL SYSTEM
Filed July 8, 1957  7 Sheets-Sheet 7

INVENTOR.
H. K. KIENZLE

United States Patent Office 2,974,734
Patented Mar. 14, 1961

2,974,734
IMPLEMENT CONTROL SYSTEM

Harold K. Kienzle, Waterloo, Iowa, assignor, by mesne assignments, to Deere & Company, a corporation of Delaware Filed July 8, 1957, Ser. No. 670,420

27 Claims. (Cl. 172—9)

This invention relates to an implement control system as applied to the control of tractor-drawn implements, and relates still more especially to automatic load and leveling control for such implements.

Implements connected directly to tractors, sometimes known as integral implements, perform significantly better if they are kept parallel to the ground. This is of particular importance when the land is rolling. In some cases, the hitch includes mechanical linkage purportedly designed to accomplish the desired result by relating the center of rotation of the implement directly to the line of draft. In cases in which the line of draft is low, the center of rotation of the implement is too far forward to contribute to the necessary levelling. According to the present invention, the center of rotation of the implement is fixed, regardless of the line of draft, with the necessary correcting energy supplied by power-operated means on the tractor. An important feature in keeping the implement parallel to the ground in operation is the derivation therefrom of the benefit of a more nearly true draft signal, because this arrangement eliminates false high pressures due to high ground pressure on the rear of a long implement in going through a swale, for example, or a false low pressure due to low ground pressure on the rear of a long implement going over a hill.

This invention features the provision of novel and relatively simple means incorporating the desirable characteristics of draft or load control with the automatically levelling arrangement. The invention has as another object the provision of means for selectively using load or position control. A still further object is the inter-connection of the levelling system to impose position-responsive forces on the control system during operation of the levelling means.

The implement control herein featured coordinates the functions of a pair of implement-adjusting means on the tractor, which adjusting means will hereinafter be referred to, for the purposes of brevity and simplicity, as power units, one of which is connected to the implement for raising and lowering the implement and the other of which is connected to the implement for adjusting the implement fore-and-aft. The implement control system involves the control of the fore-and-aft adjusting unit by servo mechanism from the lift unit, the result of which is to connect the implement to the tractor about a virtual center of rotation of the implement in a transverse vertical plane approximately through the center line of the rear axle of the tractor while the implement is in working position. It is another object of the invention to provide independent control means for locking out the levelling linkage for operation of the implement in situations in which automatic fore-and-aft levelling is not required.

The invention has for another object an independent control for effecting adjustment of the fore-and-aft adjusting unit independently of its adjustment by the lift unit. Still further features reside in improved control means comprising a relatively compact and simple arrangement of parts that may be inexpensively manufactured, assembled and maintained, with provision being made for appropriate adjustment so that the widest flexibility in operation is accommodated.

Another object of the invention is to provide an implement control system including a plurality of cylinders arranged in stacked or side-by-side relationship in fore-and-aft disposition at the rear of the tractor, one of the cylinders being connected to a transverse rockshaft for effecting vertical adjustment of an implement, another cylinder being connected to means for adjusting the implement fore-and-aft, and a third cylinder serving as a slave cylinder. Other objects are to utilize the multiple cylinders for various functions in controlling, adjusting or otherwise manipulating implements associated with the tractor. A further significant object resides in the utilization of a fluid-pressure control means enabling use of the fore-and-aft tilting cylinder as a slave cylinder for operation in conjunction with a remote cylinder. A variation of this object utilizes means for immobilizing the fore-and-aft adjusting cylinder and for by-passing that cylinder when a remote cylinder is used. In this respect, subsidiary features of the invention reside in means connecting the fore-and-aft adjusting cylinder to an adjusting member by a connection that is detachable, to provide means for temporarily supporting the detached connection, to provide means for locking the fore-and-aft movable member to the tractor with the connection effected so as to immobilize the cylinder, and to provide novel fluid control means for accomplishing this multiplicity of purposes.

Other objects reside in improved control means for obtaining the response from the lift rockshaft to the tilt cylinder, in the utilization of differential gearing in the servo means, means for selectively connecting and disconnecting the response means, and means for obtaining a servo action from the fore-and-aft adjusting unit.

The foregoing and other important objects and desirable features inherent in and encompassed by the invention will become apparent as a preferred embodiment thereof is disclosed in detail in the ensuing specification and accompanying sheets of drawins, the several figures of which will be described immediately below.

Figure 1:
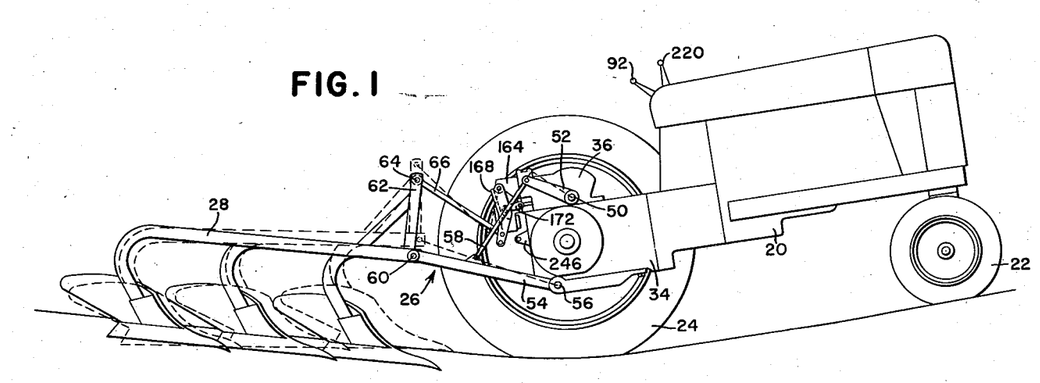
Figs. 1 and 2 illustrate, somewhat pictorially, the relative positions of a tractor and implement when passing respectively through a swale or over a ridge, the dotted lines in each instance illustrating the position that the implement would assume in the absence of a control like that forming the subject matter of the present invention.
Figure 2:
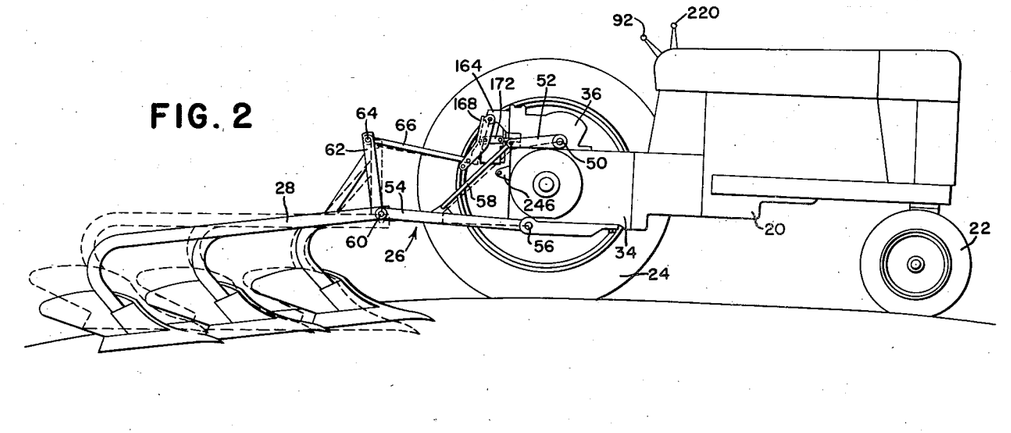
Figure 9:
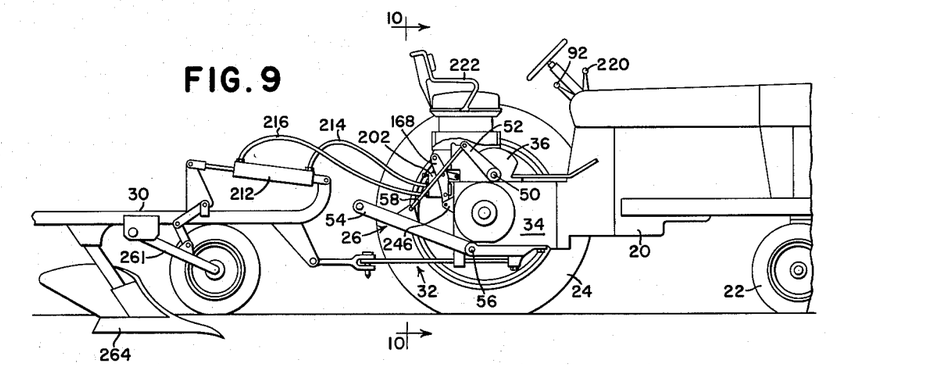
Fig. 9 is an elevational view of a tractor and implement, with the near traction wheel of the tractor removed, showing a different type of tractor and implement outfit.

The tractor chosen for purposes of illustration may be considered as representative of any of the commercially well-known types and comprises a fore-and-aft body 20 supported on front wheels 22 and rear traction wheels 24, the right hand rear wheel in each of Figs. 1, 2 and 9 having been omitted to illustrate hitch linkage 26 by means of which an implement 28 is connected to the tractor. In Figs. 1 and 2, the implement shown is a three-bottom plow, which is selected as illustrative because of its performance characteristics as concerns the desirability for fore-and-aft levelling. In Fig. 9, the implement selected for illustration is a drawn plow 30 connected to the tractor by alternative hitch means 32, the hitch means 26 not being utilized in this instance. The distinctions will be pointed out below.

The rear portion of the tractor body 20 is conventionally in the form of a transmission and final drive casing 34 which contains drive and support means for the several components to be presently described. The basic structure carried by the support means thus afforded is itself a support in the form of housing means 36 which contains a pair of power units or first and second power-operated fluid-pressure actuators 38 and 40 (Figs. 3, 4 and 5; see also Fig. 10).

The actuator or motor 38 comprises a cylinder 42 in which a piston 44 is reciprocable fore-and-aft to drive a piston rod 46 which is in turn connected to an inner arm 48 keyed to a power-operated lift member, here a transverse rockshaft 50, the outer end portions of which project exteriorly of the casing and carry force-transmitting means in the form of lift arms 52 for vertically adjusting the linkage 26. The linkage 26 is of the type comprising a pair of vertically adjustable trailing draft links 54 pivotally connected at their forward ends to the tractor body on a transverse axis at 56 and vertically movable by the actuator 38 through the medium of the rockshaft, the lift arms 52 and lift links 58.

The rear ends of the trailing draft links 54 are pivotally connected on a transverse axis at 60 to the front end of the implement 28, and rigid on the implement is a mast 62 having an upper pivotal connection 64 to a fore-and-aft extending top or thrust link 66. The pivotal connection 64 is on a transverse axis and for present purposes it will suffice to assume that the forward end of the link 66 is connected to the tractor on a transverse axis. The hitch linkage 26 thus establishes a typical quadrilateral linkage of the so-called three-point type, and vertical adjustment thereof is effected by supplying fluid under pressure to or withdrawing fluid from the actuator 38, hereinafter sometimes referred to as the lift cylinder. As already indicated, this actuator rocks the rockshaft 50 which is connected to the linkage via the lift links 58.

Figure 10:
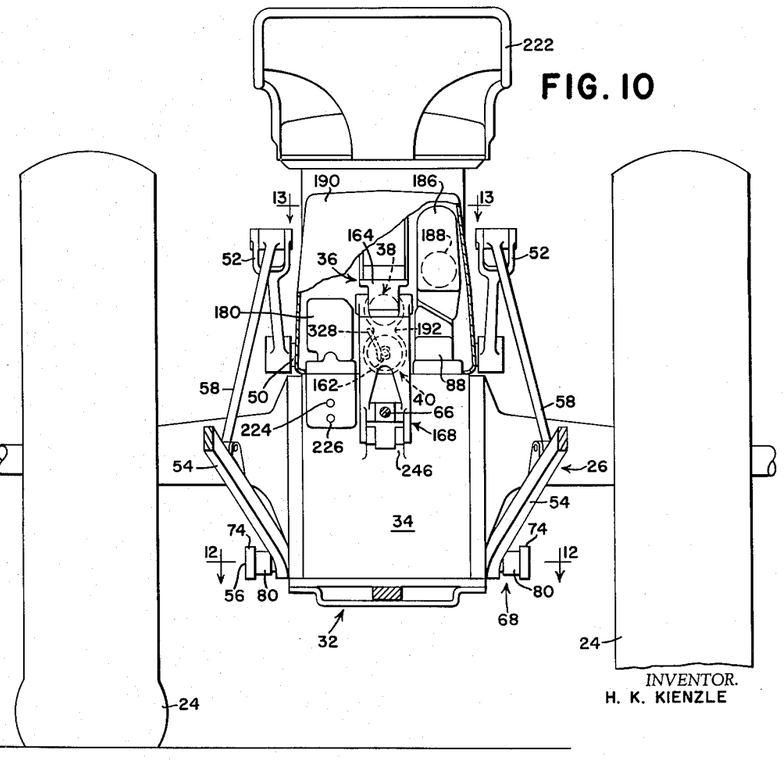
Fig. 10 is an enlarged rear view, partly in section, as seen along the line 10—10 of Fig. 9.
Figures 11, 12:
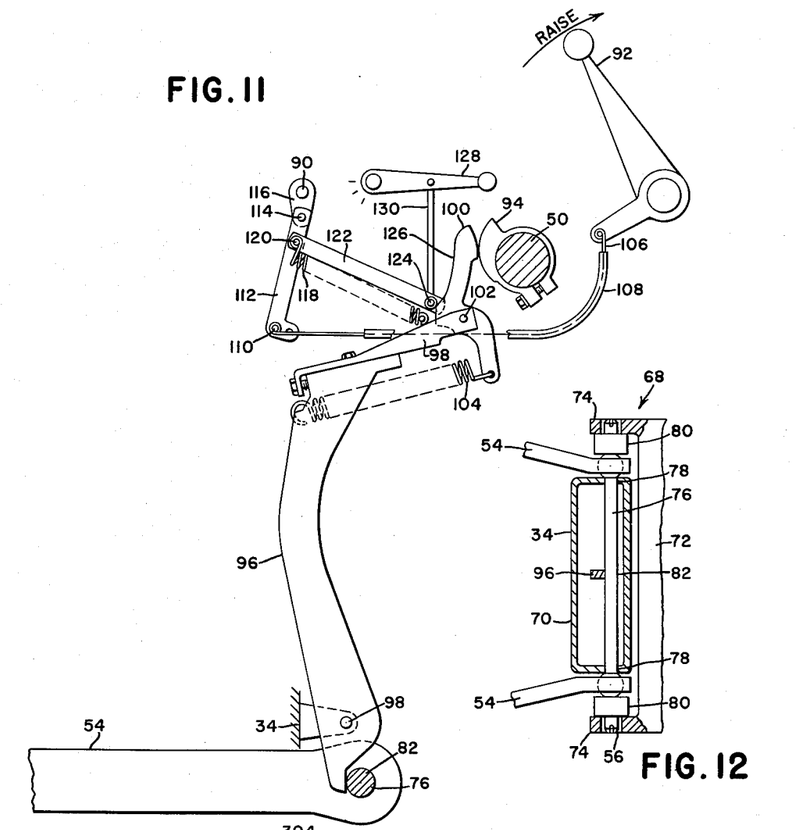
Fig. 11 is a schematic view, partly in section, showing a representative form of draft control mechanism.
Fig. 12 is a transverse fragmentary section as seen along the line 12—12 of Fig. 10.

The connection of the forward ends of the links 54 to the tractor on the transverse axis 56 comprises connection means 68 (Fig. 12) including a depending rear portion 70 of the tractor body and an under frame member 72 which provides a pair of transversely alined apertured ears 74. A transverse resilient bar 76 extends through the depending body portion 70 and has contact with the body at what may be termed opposite laterally spaced apart fulcrum points 78. Opposite ends of the bar 76 extend laterally outwardly into the apertures in the ears 74, which apertures are sufficiently large as to permit a limited amount of fore-and-aft movement of the outer ends of the bar. Spacers 80 are provided between the links 54 and the ears, and the arrangement is such that rearward tensional forces in the links 54 cause the bar 76 to act as a beam in bending, resulting in rearward deflection of the outer end portions and forward deflection of an intermediate portion thereof at 82. Fundamentally, the resilient bar acts in a manner similar to the typical draft or load control spring in a conventional draft control system, but has many advantages thereover, all as pointed out in U.S. Patent No. 2,940,530. Nevertheless, these are purely incidental in the instant disclosure and will not be dealt with at length. Suffice it to say that forward displacement of the intermediate portion 82 of the bar 76 creates a draft signal to which the control system is responsive, in a manner to be presently brought out. At this point, it should also be noted that the bar is capable of bending in the other direction, as a result of compression forces acting forwardly through the draft links 54, in which case the outer end portions of the bar will be displaced forwardly and the intermediate portion 82 of the bar will be displaced rearwardly. The draft signal thus delivered is fed to control means for the rockshaft actuator 38, and the feed may be of any conventional construction, as may be the control means itself. Since the actuator is hydraulically operated, the instant disclosure is based on a hydraulic system and a main control valve is shown schematically at 86 in Fig. 7. The valve mechanism may suitably be contained in a valve housing 88 mounted alongside the housing means 36 (Fig. 10) and the valve may be typically controlled by a rockable valve shaft 90 (Fig. 11). The valve, via the rockable shaft 90, is responsive to a manual control, represented here by a hand lever 92, to a position responder, such as a cam 94 fixed to the rockshaft 50, and to a draft responder, represented hereby a lever 96 pivoted at 98 to the internal part of the tractor body 34 and engageable with the intermediate portion 82 of the transverse resilient bar 76.

The draft responder 96 is in the form of a gooseneck having an upper forward portion to which a follower 100 is pivoted at 102, the follower being in the form of a lever, one arm of which rides the cam 94 and the other arm of which depends below the pivot 102 for connection by a tension spring 104 to the draft responder 96. The purpose of the spring is to maintain engagement between the follower and the cam 94. Connection between the hand lever 92 and the valve rockshaft 90 is here shown as being effected by a flexible cable 106, sheathed at 108 and pivotally connected at 110 to a lever 112 which is in turn pivoted at 114 to a crank arm 116 fixed to the valve shaft 90. The lever 112 is biased forwardly by a tension spring 118 and the connection of the spring to the lever 112 affords a pivotal connection 120 for a link 122 which carries at its front end a roller 124 for selective positioning along an arcuate rear portion 126 of the follower 100. Positioning of the roller 124 along the surface 126 is accomplished by an external selector lever 128 to which the link 122 is connected by a selector link 130. Changes in position of the roller 124 along the follower surface 126 vary the responsiveness of the follower to the cam 94 and, in the position shown, the link 122 receives no force from the cam regardless of the position of the rockshaft 50, because the roller 124 is proximate to the pivot 102 and changes in position of the follower 100 in response to changes in position of the cam 94 as a rockshaft 50 rocks will be so negligible as to have no effect on the valve shaft 90. This arrangement is based on that forming the subject matter of U.S. Pat. 2,921,638.

The valve shaft 90 is manually turned by the hand lever 92 in the following manner: Considering that the draft responder 96 is static, the rockshaft 50 is also static, and so is the follower 100. Consequently, when the lever 92 is rocked forwardly, it will apply tension through the cable 106 to the lower end of the lever 112. Since the follower 124 fixes the position of the forward end of the link 122, the lever 112 will fulcrum in a counterclockwise direction about its pivotal connection 120 to the link 122 so as to turn the crank arm 116 and valve shaft 90 in a clockwise direction. This will shift the valve 86 to the right from the position shown in Fig. 7 so as to supply fluid under pressure to the rear end of the actuator 38, thus forcing the actuator piston 44 forwardly to rock the lift rockshaft 50 in a clockwise direction to elevate the hitch linkage 26 and implement attached thereto.

In the specific embodiment shown, the supply of fluid under pressure to the actuator 38 is effected from a central source, here a variable displacement pump 132 which supplies a high pressure line 134 leading to the valve 86. A return line 136 returns from the valve 86 to a reservoir 138. As will be understood, the pump 132 may be driven from any convenient power source on the tractor, and the reservoir 138 may, as is usual, form part of the tractor housing structure. The side of the valve 86 opposite the high pressure line 134 is connected via a line 140, incorporating a variable choke 142, to the actuator 38 via a manually operated valved coupling 144 which is effective to cut in or cut out a remote cylinder at 146. In the illustrated position of the coupling 144, a connection is effected at 148 to a line 150 which leads directly to the rear end of the actuator 38. If the coupling is manually shifted to the right from the position shown in Fig. 7, the line 140, as well as a return line 152, is connected to a pair of lines 154 and 156 leading to the remote cylinder 146. For purposes of the present disclosure, the remote cylinder 146 may be taken as typical only of the flexibility of the system and may be otherwise disregarded, being illustrated only to complete the environment in which the invention finds particular utility. A generally comparable arrangement appears in U.S. Pat. 2,858,848.

Figure 7:
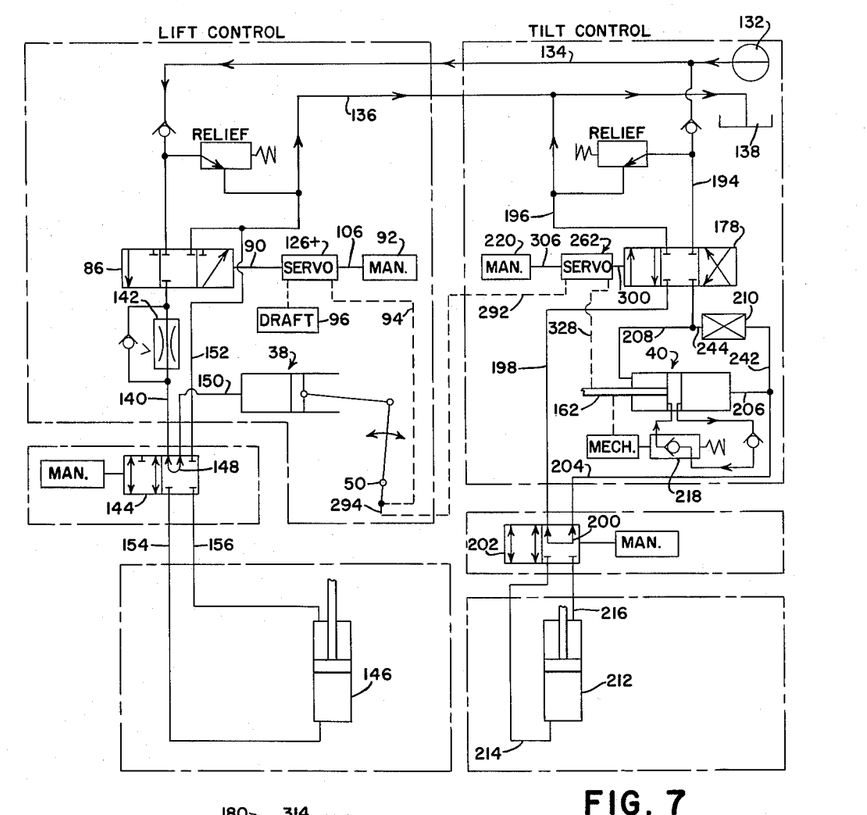
Fig. 7 is a schematic view illustrating the hydraulic circuits involved.

With the coupling in the disconnected position as shown in Fig. 7, the actuator 38 is under control of the hand lever 92, the position responder 94 and the draft responder 96. Rocking of the hand lever 92 in a rearward or counterclockwise direction reverses the actuation of the rockshaft 50 so that the rockshaft turns in a counterclockwise direction to effect lowering of the implement. As the plow bottoms enter the ground, draft force is transmitted through the links 54 to the transverse resilient bar 76 and this in turn affects the position of the draft responder 96, causing same to move fore or aft as the case may be and causing a change in the fore-and-aft position of the follower 100. Since the roller 124 on the link 122 is urged in contact with the follower by the spring 118, the valve operating lever 112 will change position according to the position of the follower and will therefore return the valve 86 to neutral.

In the event that the selector lever 128 is moved to a position swung upwardly from that shown in Fig. 11, the roller 124 will be placed at a high position on the arcuate surface 126 of the follower and therefore will be responsive to changes in position of the follower as effected by the cam 94, since upward movement of the roller 124 increases its distance from the pivot 102 and therefore effectuates a moment arm capable of effecting valve position changes in response to position changes in the rockshaft 50. However, this again is of no immediate moment and the details need not be elaborated.

As previously assumed, if the forward end of the top or thrust link 66 of the hitch linkage 26 is considered as being pivoted to the tractor on a transverse axis, the system follows essentially the conventional performance characteristics, except as modified by the specific details shown which, as already outlined, are not material to the present disclosure, but which are illustrated as representative of a specific embodiment of control system with which the present invention finds utility.

Having reference to Fig. 1, and making the above assumption relative to the pivotal connection of the forward end of the top link 66 to the tractor, as in the conventional three-point hitch (except for fore-and-aft displacement in connection with draft control), the position occupied by the implement when the outfit passes through a swale is represented by the dotted lines, which clearly demonstrates that the tendency of the plow bottoms is to run out of the ground. The reverse situation is illustrated in Fig. 2, which shows that, without levelling or tilt control, the tendency of the plow bottoms is to nose down when the outfit passes over a ridge. This characteristic is undesirable and it is accordingly one of the features of the invention to correctively adjust the implement to accommodate changes in position thereof resulting from pitching of the tractor during travel of the outfit over undulating terrain.

Figures 3, 6:
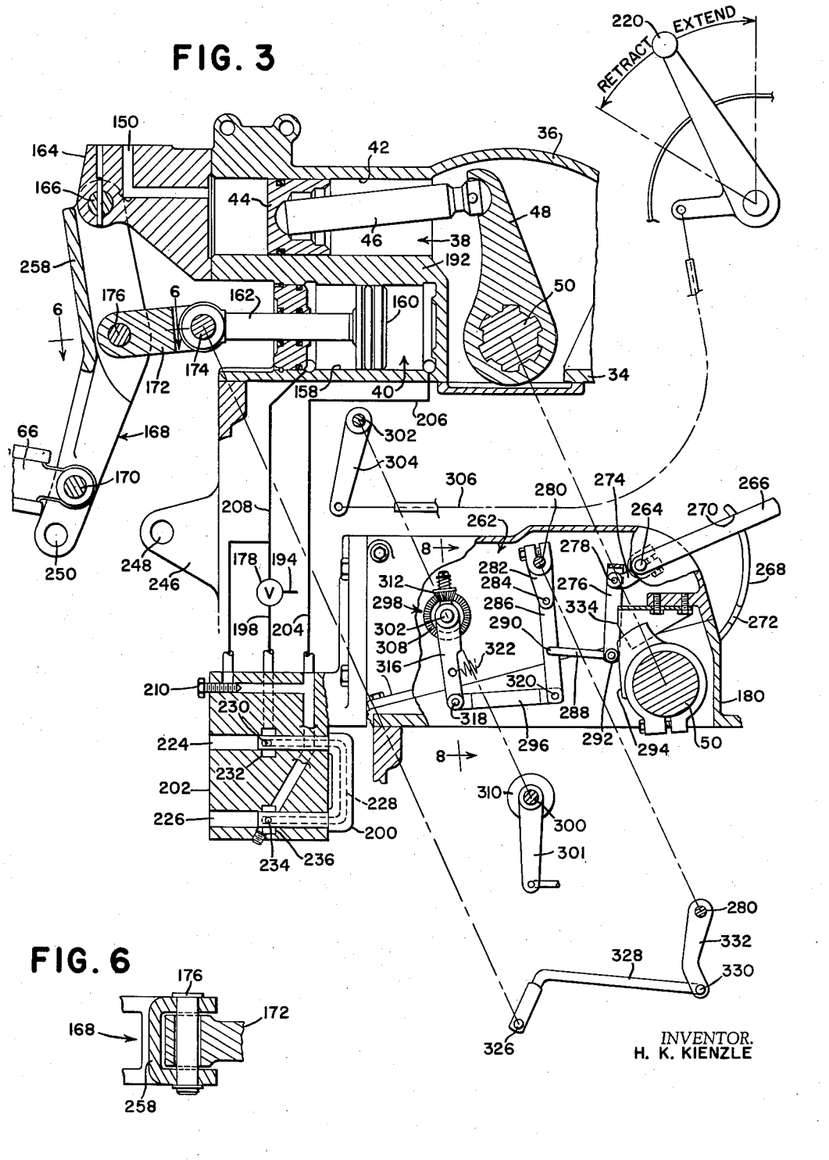
Fig. 3 is a composite view on an enlarged scale, partly schematic and partly in section, with various portions thereof displaced so as to show their relative positions, of the basic parts of the control system in one phase of operation thereof.
Fig. 6 is a fragmentary section on the line 6—6 of Fig. 3.
Figure 4:
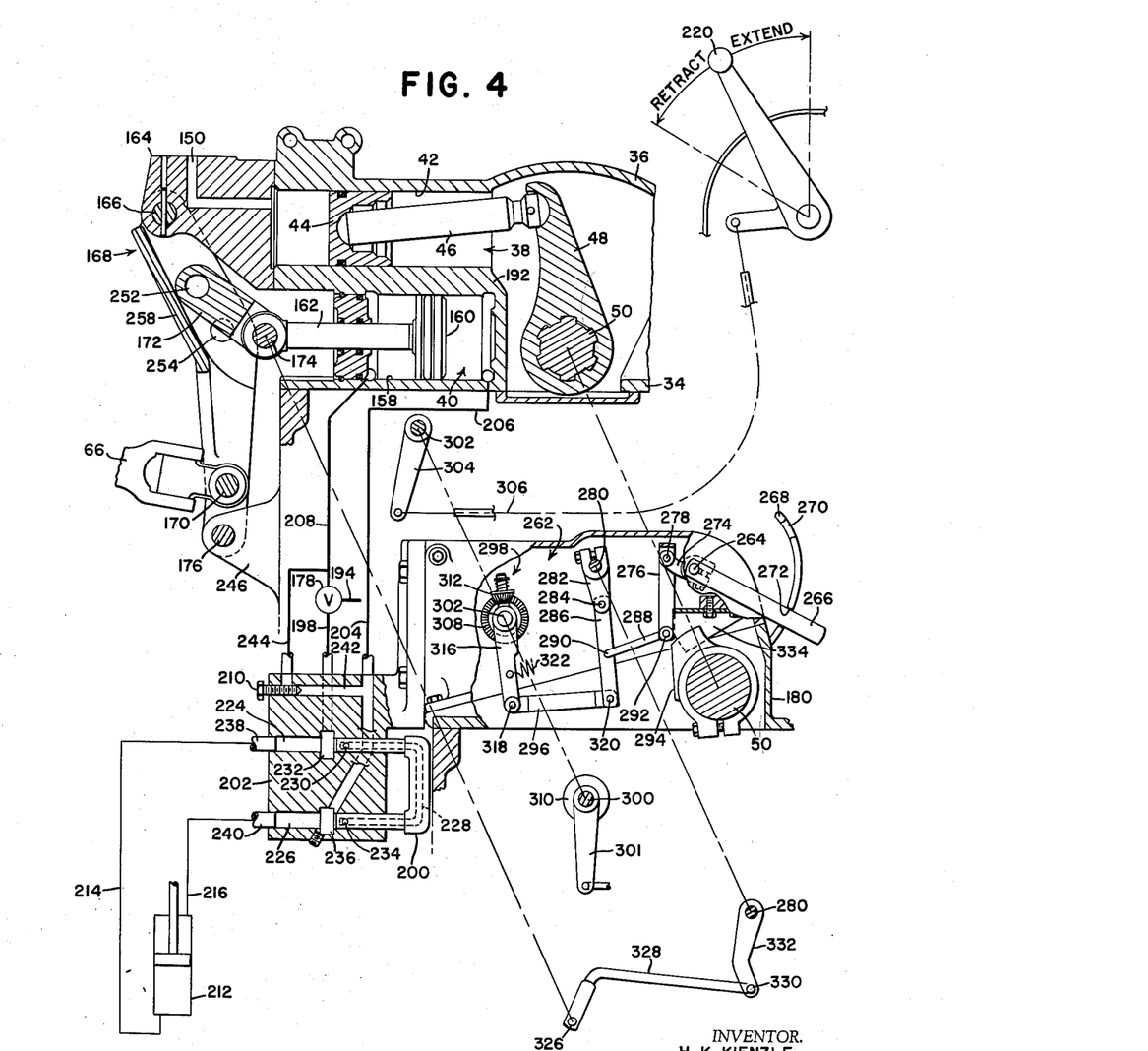
Fig. 4 is a similar view showing a further phase of operation.
Figure 5:
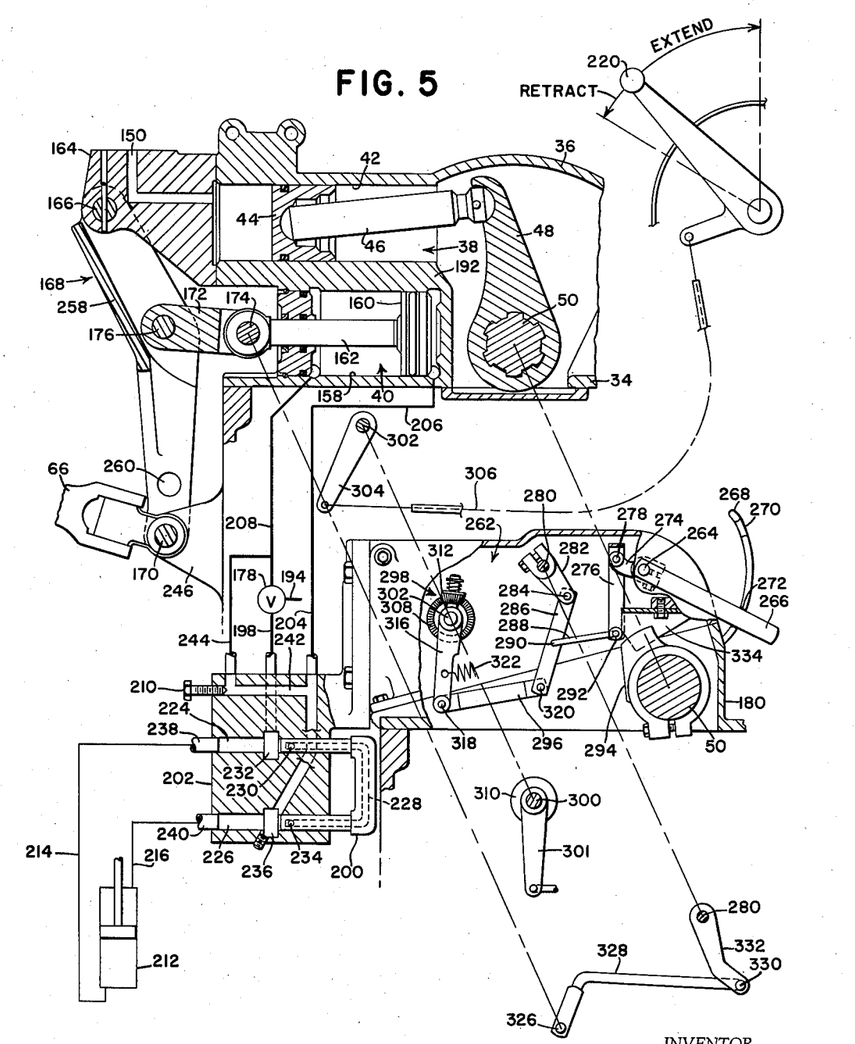
Fig. 5 is a similar view showing a still different phase of operation.

In general, what is sought to be accomplished here is fore-and-aft tilting of the implement to the respective full line positions shown in Figs. 1 and 2, and this is accomplished by use of the actuator 40. As best shown in Figs. 3, 4 and 5, the actuator 40 comprises a fore-and-aft cylinder 158 contained within the housing means 36 and mounting for reciprocation therein a piston 160 which has a rearwardly extending driving member or piston rod 162. As best seen in Fig. 10, the actuator 40 is directly below the actuator 38 and thus may be considered a lower actuator relative to the upper actuator 38.

The rear end of the piston rod 162 projects of course exteriorly of the housing means 36, and this housing means has at its rear a support portion 164 which affords a mount including a transverse pivot pin 166 for carrying a depending arm or implement-adjusting member 168. The lower portion of this arm is bifurcated and affords a disconnectible force-transmitting connection with the forward end of the top link 66 by a removable transverse pin 170. The rear or exteriorly exposed end of the piston rod 162 is linked to the tilt arm or driven member 168 by means of an intervening link 172 having a pivotal connection 174 to the piston rod and a detachable pivotal connection 176 to the arm 168.

At this point, it will be seen that extension and retraction of the tilt actuator 40 will cause fore or aft swinging of the arm 168. Since this arm is connected to the top hitch link 66 at 170, the motion just described will result in fore-and-aft shifting of the link to cause the implement to tilt about its pivotal axis 60 to the hitch linkage 26. It is the combination of fore-and-aft tilting, as just described, with the vertical adjustment of the hitch linkage 26 that marks the success of the control system in operation of the implement over undulating terrain, two examples of which are illustrated in Figs. 1 and 2.

Fluid pressure control of the tilt motor or actuator 40 is accomplished by valve mechanism, designated generally at 178 (Fig. 7) contained in a valve housing 180 positioned alongside the housing means 36. In other words, the housing means 36 is sandwiched between the previously described valve housing 88 and the valve housing 180 just referred to (Fig. 10). The three housings may be suitably mounted on a supporting plate 182 which may be bolted at 184 to the top of the transmission casing 34 of the tractor body 20. As a further adjunct to the system, the valve housing 88 may carry a third actuator or hydraulic motor 186 (Fig. 10) which contains a slave cylinder 188. The details of this actuator are not important in the present disclosure and therefore will not be elaborated. Nevertheless, the housing structure in its entirety is compactly arranged and may suitably be enclosed in a sheet metal enclosure at 190 (Fig. 10). This enclosure is omitted from Figs. 1, 2 and 9 in order to better orient the structure relative to the tractor and hitch. The enclosure is likewise omitted from Fig. 13.

Figure 13:
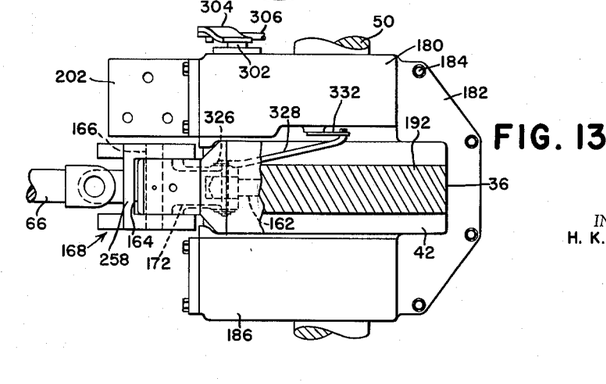
Fig. 13 is a top plan view, with portions broken away and shown in section and with enclosing structure omitted, as seen substantially along the line 13—13 of Fig. 10 and drawn to a somewhat enlarged scale.

The cylinders 42 and 158 respectively for the actuators 38 and 40 are preferably cast en bloc and are joined by a narrow web 192, which affords a reduction in transverse dimension for accommodating control structure as will presently appear (Figs. 10 and 13, for example).

The tilt control valve 178 is connected to the previously described fluid pressure system 132 etc. by a high pressure line 194 and returns to the reservoir line 136 by a line 196. The other side of the valve 178 is connected to the actuator 40 by a line 198 that has a loop 200 extending through a normally neutrally positioned manually operated coupling 202 and returns via a line 204 to one end of the actuator 40 at 206. The opposite end of the actuator is connected to the valve by a line 208, and the lines 206 and 208 are cross-connected by a by-pass valve 210, the purpose of which will presently appear.

The purpose of the coupling 202 is to enable use of the actuator 40 with a remote cylinder 212 which has its opposite ends connected to the coupling by lines 214 and 216. When the coupling is in the position shown in Figs. 3 and 7, the remote cylinder 212 is isolated from the system and the valve 178 controls the actuator 40 just as if the cylinder 212 were omitted. However, when the coupling is shifted to the right from the position shown in Fig. 7, such as to occupy the positions shown in Figs. 4 and 5, the actuator 40 and remote cylinder 212 operate in series. In order to improve the series operation of the actuator and remote cylinder, the actuator has connected thereto a typical synchronizing valve designated generally at 218 in Fig. 7 and shown as being mechanically operated from the piston rod 162. The synchronizing valve may be of any well-known construction and therefore need not be described in detail. The small rectangle alongside the synchronizing valve is labeled "Mech." to indicate that it is mechanically operated. A rectangle associated with the coupling 202 in Fig. 7 is labeled "Man." to show that it is manually operated, as in U.S. Pat. 2,858,848. The same system is applied as to the coupling 144 and to the hand lever 92 for the rockshaft valve 86. A similar box, likewise labeled "Man." represents a hand lever 220 for manipulating the tilt control valve 178. This hand lever, like that at 92, is conveniently located on the tractor for ready access to an operator on the operator's seat 222.

At this point, it may be well, referring to Figs. 3 and 7, to follow the circuit and the operation thereof in the manual extension and retraction of the tilt actuator 40. As the hand lever 220 is moved rearwardly in its "retract" direction, the control valve 178 is shifted to the right as seen in Fig. 7, porting hydraulic fluid via the line 208 to the rod or small end of the actuator 40. The by-pass valve 210 is closed. Fluid exhausted from the right hand end of the actuator leaves at 206 and follows 204 to the coupling 202, wherein the loop 200 is so positioned that the fluid follows the path through the loop to line 198 and back to the valve 178 for return to the reservoir via line 196—136.

When the hand lever 220 is moved forwardly or in the "extend" direction, the opposite result follows, fluid being ported from high pressure line 194 to line 198, thence through the coupling loop 200 and line 204 to the head end of the actuator 40 via 206. Again, the by-pass 210 is closed and prevents communication between lines 206 and 208. The actuator exhausts by a line 208 to and across the valve to reservoir line 196—136.

A sufficient portion of the circuit diagram of Fig. 7 is shown schematically in Figs. 3, 4 and 5 to facilitate an understanding of the circuit. The coupling 202 comprises a block having a pair of bores 224 and 226 therein. These bores are intersected respectively by the lines 198 and 204. When the coupling loop 200 is in the position of Figs. 3 and 7, it interconnects the lines 198 and 204 because of an internal passage 228 which opens laterally adjacent to one end at 230 to the intersection 232 of line 198 and bore 224 and which opens laterally adjacent to its opposite end at 234 to the intersection 236 of line 204 and bore 226. The loop is a U-shaped member having its opposite ends closed so as to isolate the bores 224 and 226 from the intersecting cavities 232 and 236 when the coupling is in the position of Figs. 3 and 7.

When the coupling loop 200 is moved to the position of Fig. 4, for example, the openings 230 and 234 are shifted out of register with the cavities 232 and 236, thus communicating the line 198 directly with the bore 224 and the line 204 directly with the bore 226. The remote cylinder lines 214 and 216 respectively have plug-in tubular couplings 238 and 240 which are received respectively by the bores 224 and 226. In this phase of the system (Fig. 4), the by-pass 210 remains closed and isolates the line 204—206 from the line 208, blocking a passage 242 within the coupling 202, which passage is shown schematically as being connected to the line 208 at the other side of the valve 178 by a branch 244. Of course, the commercial embodiment will, because of cored passages and the like conventionally used in valve and control housings, have an appearance somewhat different from that illustrated, but the type of illustration is resorted to in the interests of clarity.

Nevertheless, when the remote cylinder couplings 238 and 240 are plugged into the coupling bores 224 and 226, the remote cylinder 212 is in series with the actuator 40, and during this phase of operation, the pivotal connection pin 176 between the actuator link 172 and tilt arm 168 is removed and is used to lock the arm to an apertured lug 246 at the rear of the tractor housing 34. The purpose of the disconnection at 176 is to enable free movement of the actuator piston 160 without causing movement of the arm 168. The disconnection or detachability is facilitated by the use of the pin 176 in the aperture 248 in the lug means 246 and an end aperture 250 in the arm 168, the pin 176 having been withdrawn from previously registered apertures 252 and 254 respectively in the link 172 and arm 168. An additional feature is afforded by the construction of the arm 168, the rear portion of which is in the form of a web affording ramp means 258 which supports the disconnected end of the link 172 as the link moves back and forth with the piston 160.

A third variation in the system is shown in Fig. 5, wherein the pin 176 remains as a connection between the link 172 and the arm 168, but the pin 170, formerly used to connect the top link 66 to the arm 168, is removed from its aperture 260 in the arm and is replaced through the aperture 248 in the lug means 246 in common with the front end of the link 66, thus locking both the link 66 and the arm 168 to the tractor; and, since the piston rod link 172 is now connected to both the piston rod 162 and the arm 168, the piston 160 of the tilt actuator 40 is locked against movement, and remote cylinder operation may be had with the actuator 40 by-passed, which is accomplished by opening the by-pass valve 210 (Fig. 5).

One environment in which the remote cylinder 212 may be used, with the arm 168 locked to the lug 246, is illustrated in Fig. 9 in connection with a drawn implement in which the remote cylinder 212 is extended and retracted to rock a wheeled crank axle 261 for raising or lowering a plow bottom 264 carried by the implement frame 30. This phase will be covered in greater detail below.

Remote cylinder operation as shown in Fig. 4 is accomplished as follows: the by-pass 210 is closed. The pin 176 is removed as a connection between the link 172 and the arm 168 and is used to lock the arm to the tractor-mounted lug means 246. The coupling 200 is shifted to the right from the position occupied by it in Figs. 3 and 7. Therefore, the line 198 is connected directly to the remote cylinder line 214 via 232—224—238, and the other remote cylinder line 216 is connected to the line 204 via 240—226—236. Therefore, when the valve 178 is shifted to the right from its position of Fig. 7, the high pressure line 194 is connected to the line 208 which supplies the rod end of the actuator motor 40, causing this motor to retract and to idly carry its disconnected link 172. Fluid exhausted from the opposite end of the actuator 40 exits via line 206 and follows line 204, intersection cavity 236, bore 226 and line 216 to cause the remote cylinder 212 to retract. Thus, the actuator 40 retracts in series with retraction of the remote cylinder 212. Conversely, extension of the actuator 40 causes extension of the remote cylinder 212 by following the circuit in the fashion just the reverse of that described. Since the two cylinders operate in series, the synchronizing valve at 218 becomes important as a practical matter but, as already pointed out, is not part of the present invention, being illustrated merely because it is a part of the complete operative circuit. As already indicated, as the actuator piston 160 reciprocates, it carries the link 172 with it, and the disconnected end of this link rides up and down the ramp means 258 on the fore-and-aft tilt link 168 which, as already stated, is rigidly locked to the tractor at 176—246.

In that phase of the operation shown in Fig. 5, the link 172 is connected to the arm 168 by the pin 176, but the top link pin 170 is removed from its aperture 260 and the top link and arm 168 are connected in common to the tractor-mounted lug means 246 by the previously referred to pin 170. The by-pass valve 210 is opened to communicate the passages or lines 242 and 244. As will be noted, when the arm 168 is locked to the tractor at 170—246, along with the front end at the top link 66, the piston 160 of the actuator motor 40 is just to the left of its extreme right hand end. This may be accomplished mechanically or hydraulically. In any event, when the by-pass valve 210 is open, the actuator 40 is by-passed and the remote cylinder 212 is actuated independently of movement of the actuator 40. For example, when the valve 178 is shifted to connect the line 198 to the high pressure side of the system, fluid is supplied to the coupling 202 and exits therefrom at 232—224—238 to the remote cylinder line 214, extending the remote cylinder 212 and exhausting fluid from the remote cylinder line 216 to return at 240—226—236 to the line 204. Since the actuator piston 160 is immobilized, fluid returns to the other side of the valve via the passage 242 and branch 244, the by-pass valve 210 being open to establish this connection. As already pointed out, Fig. 9 shows a representative example of the use of a remote cylinder. Other examples are available, but are unimportant here except as an illustration of the flexibility of the improved control system.

Manual operation of the tilt actuator 40 via the hand lever 220 and tilt valve 178 was touched upon briefly above and, although that is a significant aspect of the control of the implement for securing correct operation thereof, the automatic fore-and-aft levelling is of greater significance. This is achieved by servo mechanism indicated in its entirety by the numeral 262, which mechanism is contained in the valve casing 180.

In the following description, reference will be had primarily to Fig. 3, wherein the fore-and-aft tilt arm 168 is connected to the piston rod 162 of the tilt actuator 40 by the link 172 and is therefore free to rock fore-and-aft to control the attitude of the implement via the top link 66.

In general, automatic fore-and-aft levelling occurs in response to movement of the lift rockshaft 50 so that rockshaft is caused to rock in one direction or the other according to whether the implement and tractor are passing over a hill or through a swale. As best shown in Fig. 1, which represents the swale phase, it will be seen that as the front end of the tractor pitches upwardly, the force exerted by the implement on the lift links 58 will be in an upward direction, causing the rockshaft 50 to turn in a clockwise direction. This is illustrated in broken lines in Fig. 1. Fig. 2 shows the reverse operation; that is, the front end of the tractor pitches downwardly as the tractor-implement outfit passes over a hill, and forces from the implement on the lift links 58 are in a downward direction, causing the lift rockshaft 50 to turn in a counterclockwise direction. This again is illustrated in broken lines. The full lines in Figs. 1 and 2 illustrate the corrected positions of the implement in the respective instances.

Correction of the implement attitude is achieved by feeding the motion of the rockshaft 50 to the servo mechanism 262 which in turn controls the valve 178 for extending or retracting the tilt actuator 40, as the case may be.

The casing 180 carries a transverse selector shaft 264 which is externally controlled by a selector member or lever 266 having an engaged position (Fig. 3) and a disengaged position (Figs. 4 and 5). A sector 268 has appropriate notches 270 and 272 for securing the selected position of the selector lever. Within the casing 180, the selector shaft 264 carries a short arm 274 to which the upper end of a depending lever 276 is pivoted at 278. A second shaft 280, parallel to the selector shaft 264, carries internally of the housing or casing 180 an arm 282 rigid thereon, and a pivot 284 suspends a lever 286, to the intermediate portion of which the lever 276 is connected by a link 288. The connection of the link 288 to the lever 286 is pivotal at 290 and the connection of the link 288 to the lever 276 is also pivotal, incorporating a roller or follower 292 which normally follows a cam or responder 294 that is fixed to the rockshaft 50 within the casing 180.

As the rockshaft 50 turns, the cam 294, rigid therewith, of course changes positions and by means of the roller 292 causes changes in positions of the lever 276 and lever or beam 286. This motion is utilized through an intervening link 296 and differential gearing 298 to shift the valve 178, a representative or input valve shaft for which is shown at 300. This type of controller for the valve is, like the valve itself, broadly immaterial, and those shown are merely representative.

Figure 8:
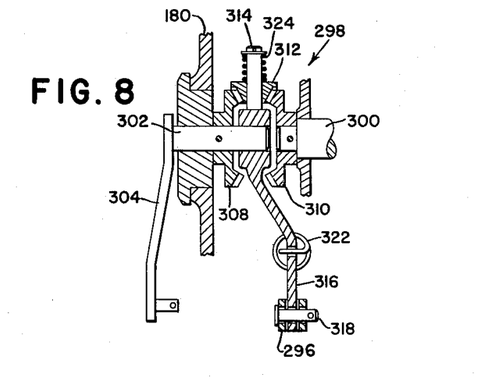
Fig. 8 is an enlarged section generally on the line 8—8 of Fig. 3.

The differential gearing, like the other mechanism just described, with the exception of the selector lever 266, is contained within the valve casing 180; although, as best shown in Fig. 8, the valve shaft 300 extends externally of the casing for an appropriate connection to the valve 178, as by an arm and link means 301, the details of which are not material. The valve shaft is rotatably mounted in the casing coaxially with a control shaft 302 which has fixed thereto a depending arm 304, the lower end of which is connected by a sheathed cable 306 to the fore-and-aft control lever 220. Movement of this lever back and forth acts through the sheathed cable to turn the control shaft 302. Pinned to the shaft 302 is a bevel gear 308 facing a bevel gear 310 that is fixed to the valve shaft 300. The bevel gears are of the same size and are in constant mesh with an intervening bevel pinion 312 rotatable on a stub shaft 314 formed integrally with an intermediate arm 316, the lower end of which is pivotally connected at 318 to the previously described fore-and-aft link 296. The forward end of the link 296 is pivotally connected at 320 to the lower end of the lever or beam 286. Biasing means, here in the form of a tension spring 322 is connected to the arm 316 and exerts a forward biasing force on the linkage just described, which force tends to keep the roller 292 constantly in engagement with the rockshaft cam or responder 294. A coil spring 324 encircles the shaft 314 and exerts a light pressure on the bevel pinion 312 and acts to take the back lash out of the gearing. One of the advantages of the gearing over linkage, for example, is that it prevents the occurrence of an over-center action, which very often occurs in linkage because of the toggle action. This is significant in a sensitive system involving the type of feed back involved here.

The arm 316 is, of course, journaled on the inwardly projecting end of the control shaft 302 and the arrangement is such that if either arm 304 or 316 is held and the other turned, the resultant motion will be transmitted to the valve shaft 300. By this mechanism, the valve is responsive not only to input from the hand lever 220 or from the rockshaft cam 294 but also from follow-up means operative to return the valve to neutral when the actuator 40 extends or retracts in an amount proportional to the input fed into it in the first instance. For this purpose, the pivot pin 174 that connects the actuator piston rod 162 to the connecting link 172 for the fore-and-aft tilt arm 168 has an extension or equivalent pivotal connection 326 from which a feed back link 328 extends forwardly for pivotal connection at 330 to the lower end of an arm 332 rigid on the cross shaft 280 that was previously described. As best seen in Figs. 10 and 13, the previously described narrowing or web structure 192 between the two actuators 38 and 40 provides a space to accommodate the link 328, which space is partly afforded by the lateral spacing between the housing means 36 and the valve casing or housing 180. The link 328 operates to transmit motion from the actuator 40 to the shaft 280 and thence to the beam 286 and ultimately to the differential gearing 298 for restoring the neutral position of the valve 178.

When the selector lever 266 is moved to its lower position and releasably retained by the sector notch 272, the resulting rocking of the selector shaft 264 acts through the arm 274 to lift the lever 276 so that the follower 292 is raised clear of the rockshaft responder cam 294 (Figs. 4 and 5). In the locked-out or disengaged position of the mechanism, the roller 292 is urged forwardly by the spring 322 against a ramp or lockout member 334, the shape of which is such as to constitute no interference with the roller 292 when the selector lever is in its upper or engaged position (Fig. 3).

*Operation*

The results of automatic fore-and-aft levelling are obtained by setting the selector lever 266 in its upper position as shown in Fig. 3. The by-pass valve 210 is closed and operation will be considered in the absence of the remote cylinder 212. The piston rod 162 of the fore-and-aft tilt actuator 40 is connected by the link 172 to the arm 168 and the arm is free from the lug means 246 so that it may rock about its transverse pivot 166 to adjust the attitude of the implement fore-and-aft about the pivot axis 60 between the implement and the hitch linkage 26.

When the plowing operation is begun, the depth lever 92 will be used to secure the proper plowing depth, which depth will be maintained by the automatic draft load means previously described as including the transverse bar 76 and draft responder mechanism. As long as the outfit encounters normal terrain, the system will operate with all the characteristics of a conventional draft control system, except for advantages inherent in the particular type of arrangement disclosed, which may be considered of no moment in the instant application.

When the tractor encounters a hill and passes thereover, the front end of the tractor will pitch downwardly and the draft control system just described will cause the lift rockshaft 50 to rotate in a counterclockwise direction, because draft on the tractor decreases and the draft system compensates therefor by causing the plow to tend to operate at an increased depth. Since the levelling cam or responder 294 is fixed to the rockshaft 50, it will partake of the counterclockwise rotation of the rockshaft and will force the roller 292 to the rear, which force will be transmitted through the link 283 to the beam 286 to swing the beam in a clockwise direction about the pivot 284 as a fulcrum, the arm 282 on the shaft 280 being temporarily fixed because this shaft is connected by the external arm 332 and link 328 to the temporarily stationary tilt actuator 40.

As the beam 286 swings in the aforesaid clockwise direction, it drives the link 296 rearwardly or to the left as seen in the drawings, causing the lever or arm 316 to turn in a clockwise direction about its journal on the control shaft 302. This shaft is temporarily fixed, by means of the connection 304—306 to the hand lever 220, which has initially been positioned in an intermediate position to obtain the best results. As is conventional with control levers, the positioning thereof is selectively settable and the setting may be upset manually but normally linkage connected thereto has insufficient force to change the position of such lever. Accordingly, the bevel gear 308, which is pinned to the shaft 302, is temporarily stationary and as the arm 316 turns clockwise it causes the pinion 312 to roll around the stationary bevel gear 308. The result of this action is that the bevel gear 310 is also turned clockwise and carries with it the valve shaft 300 pinned thereto. The shaft 300 transmits its motion to the tilt valve 178 via the arm and link means 301, causing that valve to move to the left as seen in Fig. 7, whereupon high pressure fluid from the line 194 is ported to the line 198 and through the coupling 202 back to the head end of the tilt actuator 40, causing the actuator to extend. As the actuator extends, its piston moves rearwardly and the rearward force is transmitted through the piston rod 162 and link 172 to the tilt arm 168 and thence to the top link 66 for tilting the implement in such manner that its front end noses upwardly. In short, the correction in attitude is represented by the difference between the full lines and the dotted lines in Fig. 2, the full lines representing the corrected position.

As the piston 160 moves to the rear in accomplishing the foregoing result, it causes a change in position of the follow-up link 328 which, as previously described, is connected to the arm 332 which in turn causes the shaft 280 to turn in a clockwise direction. As the internal arm 282 on the shaft 280 turns clockwise as aforesaid, it carries the upper end of the beam 286 rearwardly, the beam now pivoting in a counterclockwise direction about the pivot 290 as a fulcrum, the lower end moving forwardly to swing the arm 316 forwardly via the link 296, which is just the reverse of the action it received before. Again, the bevel gear 308 on the control shaft 302 is fixed because of the setting of the hand lever 220 and, as the arm 316 turns in a counterclockwise direction, it causes the pinion 312 to roll around the bevel gear 308, and the pinion carries the bevel gear 310 on the shaft 300 also in a counterclockwise direction to return the tilt valve 178 back to the right or to its neutral position. Subsequent downward pitching of the forward end of the tractor will entail repetition of the foregoing results, initially setting the valve 178 to the left to obtain the corrected position of the implement, which will be followed by return of the valve to neutral through the follow-up linkage 328 etc.

In operation of the outfit through a swale (Fig. 1) just the reverse of the foregoing will obtain. That is to say, as the forward end of the tractor pitches upwardly, the front end of the implement tends to rise and therefore tends to cause the rockshaft 50 to rotate in a clockwise direction. This is followed, of course, by turning of the levelling responder cam 294 in the same direction, presenting a lower portion of the cam to the follower roller 292. Since the spring 322 acts through the linkage to ultimately cause the follower 292 to stay with the cam 294, it follows that the arm 316 will ultimately be turned in a counterclockwise direction to cause shifting of the valve 178 to the right from the neutral position of Fig. 7. Hydraulic fluid is ported to the rod end of the actuator 40 via the line 202, causing the actuator to retract and to move the piston 160 forwardly so as to draw forwardly on the tilt arm 168 and top link 66 of the hitch linkage 226, changing the position of the implement from that shown in dotted lines in Fig. 1 to that shown in full lines, thereby correctively compensating for the tendency of the plow bottoms to run out of the ground. Again, the follow-up action through the link 328 etc. will be involved.

The servo relationship between the main or lift rockshaft 50 and the actuator 40 via the mechanism 262 may be varied by moving the hand lever 220 between its extreme positions, which will result in actuation of the valve 178 in the manner previously described in connection with manual operation thereof. In a normal hitch linkage such as that shown at 26, the top link 66 is adjustable fore-and-aft to vary the distance between the top of the implement and the tractor, and such adjustment is incorporated in the top link 66 shown here. Maximum range of compensation for both hill and swale operation in the present disclosure will be obtained by adjusting the center link length at 66 so that the implement assumes its proper fore-and-aft level position with the hand lever 220 substantially in its central position.

In the use of the tractor with implements in which fore-and-aft levelling is not required or not desired, the signal of feed from the levelling cam 294 on the main or lift rockshaft 50 can be negatived by moving the selector lever 266 to its lower or disengaged position, as in Fig. 4. This action results in moving the roller 292 upwardly and clear of the cam 294 and in engagement with the stationary ramp 334. In this status of the parts, manual fore-and-aft levelling may be achieved by manipulation of the hand lever 220 in the manner described above, but changes in position of the rockshaft 50 will have no effect on the mechanism 262, because, as said above, the follower roller 292 is clear of the rockshaft cam 294.

It will be clear from the foregoing that the valve 178 is returnable to neutral in response to the attainment by the piston 160 in the actuator 40 of a position proportional to the setting introduced thereinto by the hand lever 220, for example. Accordingly, if the actuator piston rod 162 is disconnected from the fore-and-aft adjusting arm 168 and the system set up as shown in Fig. 4 with the remote cylinder 212, so that the actuator 40 serves as a slave to the cylinder 212, the latter will be position-responsive. This follows, because the two pistons are synchronized and the position of the piston in the remote cylinder will be reflected by the position of the piston in the actuator 40. Since this piston is connected to the mechanism 262 by the follow-up linkage 328, the valve 178 will be returned to neutral when the piston in the remote cylinder 212 reaches a position initially set into it by positioning of the hand lever 220. During this type of operation, as exemplified in Fig. 9, the implement may be such as to require no top link such as at 66, in which case this link can be removed. This will have no effect on lockout of the arm 168 at 176—246.

Another variation on the environment in Fig. 9 is the use of the remote cylinder 212 as a selectively controlled cylinder in which the actuator 40 is immobilized as shown in Fig. 5. This has been covered above and is deemed to require no repetition.

One final point that should be briefly explained is the difference between the position of hand lever 220 in Fig. 5 and its position in each of Figs. 3 and 4. This difference is due to the extreme retracted position of the piston 160 in the motor 40 when the arm 168 and top link 66 are locked up to the tractor at 170—246. This change is also reflected by changes in the links etc. of the mechanism 262 to coordinate the neutral position of the valve 178 with the changed position of the hand lever 220. Another way of looking at it is to assume that the hand lever 220 is moved from its Fig. 3 or 4 position and in its "retract" direction to retract the piston 160 to the Fig. 5 position, after which the lock-up at 170—246 is effected. Since the follow-up rod or link 328 follows the piston 160, it will incur the Fig. 5 position of the mechanism 262 when it functions to restore valve 178 to neutral. The hand lever 220 need not be moved in either direction through the maximum angles shown in order to achieve retraction and extension of the motor 40 (Figs. 3 and 4) or retraction and extension of the remote motor 212 (Fig. 5).

When the system is set up as in Fig. 5 and the piston 160 is locked, the follow-up rod 328 is also locked and the control lever 220 must be manually restored to its neutral position.

Summary

The servo mechanism 262 and its relationship to the system as a whole is possessed of many desirable features. Of these, efficiency and accuracy in operation are foremost. Also significant is the adaptability of the design to a compact arrangement so that it can be incorporated along with draft control or other types of control systems. Features and advantages other than those just referred to and in addition to those previously outlined will appear in part from the foregoing detailed description and others will suggest themselves to those versed in the art. These, along with various modifications in the preferred embodiment disclosed, are available without departure from the spirit and scope of the invention.

What is claimed is:

1. In a tractor-implement outfit in which the implement is connected to the tractor for vertical movement and also for fore-and-aft tilting relative to the tractor as the tractor pitches on uneven terrain, the improvement comprising: a power-operated lift member mounted on the tractor for movement selectively in opposite directions; force-transmitting means interconnecting the implement and member for moving the implement vertically by power-operated movement of said member and for causing movement of said member by vertical movement of the implement when the tractor pitches relative to the implement; power-operated tilt means including a hydraulic actuator disposed fore-and-aft and rigidly mounted on the tractor independently of the implement and having a fore-and-aft piston rod projecting toward the implement; means connecting the piston rod to the implement for causing fore-and-aft tilting of the implement by operation of said actuator; valve means for activating and deactivating said actuator; and means interconnecting the valve means and the lift member for operating the valve means to cause activation of the actuator to correctively tilt the implement in response to movement of the lift member by vertical movement of the implement when the tractor pitches as aforesaid.

2. In a tractor-implement outfit in which the implement is connected to the tractor for vertical movement and also for fore-and-aft tilting relative to the tractor as the tractor pitches on uneven terrain, the improvement comprising: housing means on the tractor containing upper and lower closely parallel fore-and-aft fluid pressure cylinders and pistons respectively in said cylinders; a transverse rockshaft connected to the upper cylinder piston and having force-transmitting means connected to the implement for moving the implement vertically by upper-cylinder-actuated movement of the rockshaft and for causing rocking of said rockshaft by vertical movement of the implement when the tractor pitches relative to the implement; fluid-pressure control means on the tractor including valve means for the lower cylinder to supply fluid under pressure selectively to opposite ends thereof for moving said lower cylinder piston fore-and-aft; means connecting said lower cylinder piston to the implement for causing fore-and-aft tilting of the implement by fore-and-aft movement of said lower cylinder piston; and means interconnecting the rockshaft and said valve means for controlling the supply of fluid pressure to the lower cylinder to correctively tilt the implement in response to rocking of the rockshaft by vertical movement of the implement when the tractor pitches as aforesaid.

3. In a tractor-implement outfit in which the implement is connected to the tractor for vertical movement and also for fore-and-aft tilting relative to the tractor as the tractor pitches on uneven terrain, the improvement comprising: housing means on the tractor containing upper and lower closely parallel fore-and-aft fluid-pressure cylinders and pistons respectively in said cylinders; a transverse rockshaft connected to the upper cylinder piston and having force-transmitting means connected to the implement for moving the implement vertically by upper-cylinder-actuated movement of the rockshaft and for causing rocking of said rockshaft by vertical movement of the implement when the tractor pitches relative to the implement; a valve housing alongside the lower cylinder and spaced laterally therefrom; fluid-pressure control means including valve means in said valve housing for supplying fluid under pressure selectively to opposite ends thereof for moving said lower cylinder piston fore-and-aft, said valve meanse including a controller projecting laterally into the space between the valve housing and the housing means; a piston rod connected to the lower cylinder piston and projecting toward the implement and exteriorly of the housing means; means connecting the piston rod to the implement for incurring fore-and-aft tilting of the implement by fore-and-aft movement of the piston rod; and means interconnecting the rockshaft and the valve means for controlling the supply of fluid pressure to the lower cylinder to correctively tilt the implement in response to rocking of the rockshaft by vertical movement of the implement when the tractor pitches as aforesaid, said interconnecting means including an element connected to the piston rod and extending in the aforesaid space and connected to the valve means controller.

4. In a tractor-implement outfit in which the implement is connected to the tractor for vertical movement and also for fore-and-aft tilting relative to the tractor as the tractor pitches on uneven terrain, the improvement comprising: housing means on the tractor containing first and second closely parallel fore-and-aft fluid-pressure cylinders and pistons respectively in said cylinders; a transverse rockshaft connected to the first cylinder piston and having force-transmitting means connected to the implement for moving the implement vertically by first-cylinder-actuated movement of the rockshaft and for causing rocking of said rockshaft by vertical movement of the implement when the tractor pitches relative to the implement; fluid-pressure control means including valve means for the second cylinder to supply fluid under pressure selectively to opposite ends thereof for moving said second cylinder piston fore-and-aft; means connecting said second cylinder piston to the implement for causing fore-and-aft tilting of the implement by fore-and-aft movement of said second cylinder piston; and means interconnecting the rockshaft and said valve means for controlling the supply of fluid pressure to the second cylinder to correctively tilt the implement in response to rocking of the rockshaft by vertical movement of the implement when the tractor pitches as aforesaid.

5. In a tractor-implement outfit in which the implement is connected to the tractor for vertical movement and also for fore-and-aft tilting relative to the tractor as the tractor pitches on uneven terrain, the improvement comprising: housing means on the tractor containing first and second fore-and-aft fluid pressure cylinders and pistons respectively in said cylinders; a transverse rockshaft connected to the first cylinder piston and having force-transmitting means connected to the implement for moving the implement vertically by first-cylinder-actuated movement of the rockshaft and for causing rocking of said rockshaft by vertical movement of the implement when the tractor pitches relative to the implement; a valve housing alongside the housing means and spaced laterally therefrom; fluid-pressure control means including valve means in said valve housing for supplying fluid under pressure selectively to opposite ends thereof for moving said second cylinder piston fore-and-aft, said valve means including a controller projecting laterally into the space between the valve housing and the housing means; a piston rod connected to the second cylinder piston and projecting toward the implement and exteriorly of the housing means; means connecting the piston rod to the implement for incurring fore-and-aft tilting of the implement by fore-and-aft movement of the piston rod; and means interconnecting the rockshaft and the valve means for controlling the supply of fluid pressure to the lower cylinder to correctively tilt the implement in response to rocking of the rockshaft by vertical movement of the implement when the tractor pitches as aforesaid, said interconnecting means including an element connected to the piston rod and extending in the aforesaid space and connected to the valve means controller.

6. For an agricultural tractor-implement outfit: control mechanism comprising a support; an implement adjusting member carried on the support for change between static and moving conditions; a hydraulic implement actuator; valve means for the actuator including a valve shaft rockable on the support; a control shaft rockably carried by the support separate from but coaxial with the valve shaft; bevel gears fixed respectively to said shafts and facing each other; a response arm rockable coaxially with and journaled relative to the shafts and having a portion between said gears; a bevel pinion journaled on said portion and meshing with said gears; manual means for turning the control shaft; and force-transmitting means responsive to changes in the implement adjusting member for rocking the response arm.

7. The invention defined in claim 6, in which: the force-transmitting means is disconnectible; and means is provided for immobilizing the response arm when the force-transmitting means is disconnected.

8. The invention defined in claim 6, in which: the force-transmitting means comprises a follower engaged by and movable in response to movement of the implement adjusting member, a follow-up shaft rockable on the support and having a crank arm, a lever fulcrumed at one end on the crank arm and connected at its other end to the response arm, and fulcrum means connecting the lever intermediate its ends to the follower; and follow-up means comprising an element movable by the actuator and connected to and for turning the follow-up shaft.

9. The invention defined in claim 8, including: means biasing the follower into engagement with the implement adjusting member; selector means for withdrawing the follower from engagement with said member; and means for immobilizing the withdrawn follower to stabilize the fulcrum means for the lever.

10. For an agricultural tractor-implement outfit: control mechanism comprising a support; an implement adjusting member carried on the support for change between static and moving conditions; a hydraulic implement actuator; valve means for the actuator including a valve shaft rockable on the support; a control shaft rockably carried by the support separate from but coaxial with the valve shaft; a response arm rockable coaxially with and journaled relative to the shafts; differential gearing interconnecting the shafts and response arm for turning the valve shaft by the control shaft when the response arm is static and for turning said valve shaft by the response arm when the control shaft is static; a settable control member for selectively turning and holding the control shaft; a follower selectively static or movable according to the implement adjusting member and connected to the response arm; and force-transmitting means connected to the follower for selectively turning or holding the response arm.

11. For an agricultural tractor-implement outfit: control mechanism comprising a support; an implement adjusting member carried on the support for change between static and moving conditions; an implement actuator separate from the adjusting member and including activating means including an activator valve shaft rockable on the support; a control shaft rockably carried by the support separate from but coaxial with the valve shaft; differential gearing interconnecting the shafts and response arm for turning the activator shaft by the control shaft when the response arm is static and for turning said activator valve shaft by the response arm when the control shaft is static; a settable control member for selectively turning and holding the control shaft; a follower selectively static or movable according to the implement adjusting member and connected to the response arm; and force-transmitting means connected to the follower for selectively turning or holding the response arm.

12. In a tractor-implement outfit including a movable force-receivable implement part, mechanism for transmitting force to said part, comprising: a generally upright arm; means mounting said arm on the tractor for fore-and-aft swinging; a fluid pressure cylinder on the tractor and carrying a piston for fore-and-aft movement, said piston having a piston rod extending toward the arm; a link having connections to the piston rod and to the arm for swinging the arm upon fore-and-aft movement of the piston, one of said connections being detachable to free the arm from the piston rod; means on the arm for connection to and for transmitting force to the implement part; and means on the tractor and selectively connectible to the arm for locking the arm against swinging so as to hold said part.

13. In a tractor-implement outfit having a movable force-receivable implement part, mechanism for transmitting force to said part, comprising: a generally upright arm; means mounting said arm on the tractor for fore-and-aft swinging; a fluid pressure cylinder on the tractor and carrying a piston for fore-and-aft movement, said piston having a piston rod extending toward the arm; a link having connections to the piston rod and to the arm for swinging the arm upon fore-and-aft movement of the piston, the connection between the link and the arm being detachable to free the arm from the piston rod; means on the arm for connection to and for transmitting force to the implement part; means on the tractor and selectively connectible to the arm for locking the arm against swinging so as to hold said part; and ramp means on the arm to support the detached link during movement thereof by the piston when the arm is locked.

14. In a tractor-implement outfit having a movable force-receivable implement part, mechanism for transmitting force to said part, comprising: an arm; means mounting said arm on the tractor for swinging back and forth; power-operated means on the tractor including a member movable back and forth generally in the plane of swinging of the arm; a link having connections to the arm and member, the connection between the arm and link being detachable to free the arm from the link so that the link and member may move back and forth independently of said arm; means on the arm for connection to and for transmitting force to said part, means for selectively locking the arm to the tractor so as to hold said part against movement; and means on the arm for temporarily supporting the arm-detached link during movement of said link and member independently of the arm.

15. In a tractor-implement outfit including a plurality of force-receivable parts, mechanism for transmitting forces to said parts, comprising: a driven member mounted on the tractor for movement back and forth and having means affording a force-transmitting connection to one of said parts; a first fluid-pressure-operated actuator on the tractor and including a reciprocable driving member; a link having connections to said members for effecting movement of said members in unison in a first operating condition to transmit force to said one part, the connection of said link to one member being detachable while the other link connection remains connected to enable selective operation of the actuator independently of the driven member in a second operating condition; means for selectively locking the driven member against movement in said second condition so as to hold said one part, said locking means being operative also to lock the driven member while the link is connected between the two members so as to hold both members in a third operating condition to immobilize both said one part and the actuator; means on said one member from which the link connection is detached for temporarily supporting the link in said second condition; a second fluid-pressure-operated actuator having force-transmitting means connectible to another of said parts; fluid-pressure supply means having first fluid lines connected respectively to opposite ends of the first actuator for selectively extending and retracting the driving member; second fluid lines selectively connectible in series between the two actuators to operate the two actuators in unison and selectively disconnectible from at least one actuator; and by-pass means for by-passing the first actuator when the second fluid lines are connected so as to supply fluid pressure to the second actuator while the first actuator is immobilized in said third condition.

16. In a tractor-implement outfit having a plurality of force-receivable parts, mechanism for transmitting forces to said parts, comprising: a driven member mounted on the tractor for movement back and forth and having means affording a force-transmitting connection to one of said parts; a first fluid-pressure-operated actuator on the tractor and including a reciprocable power member; a link having connections to said members for effecting movement of said members in unison in a first operating condition to transmit force to said one part, the connection of said link to one member being detachable while the other link connection remains connected to enable selective operation of the actuator independently of the driven member in a second operating condition; means for selectively locking the driven member against movement in said second operating condition so as to hold the position of said one part, said locking means being operative also to lock the driven member while the link is connected between the two members so as to hold both members in a third operating condition to immobilize both said one part and the actuator; a second fluid-pressure-operated actuator having force-transmitting means connectible to another of said parts; fluid-pressure supply means having first fluid lines connected respectively to opposite ends of the first actuator for selectively extending and retracting the power member; second fluid lines connectible in series between the two actuators to operate the two actuators in unison and selectively disconnectible from at least one actuator; and by-pass means for by-passing the first actuator when the second fluid lines are connected so as to supply fluid pressure to the second actuator while the first actuator is immobilized in said third condition.

17. In a tractor-implement outfit including a plurality of force-receivable parts, mechanism for transmitting forces to said parts, comprising: a driven member mounted on the tractor for movement back and forth and having means affording a force-transmitting connection to one of the parts; a first fluid-pressure-operated actuator on the tractor and including a reciprocable driving member; connecting means interconnecting said members for effecting movement of said members in unison in a first operating condition to transmit force to said one part, said connecting means being detachable to enable selective operation of the actuator independently of the driven member in a second operating condition; means for selectively locking the driven member against movement in said second condition so as to hold said one part, said locking means being operative also to lock the driven member while the connecting means is connected between the two members so as to hold both members in a third operating condition to immobilize both said one part and the actuator; a second fluid-pressure-operated actuator having force-transmitting means connectible to another of said parts; fluid-pressure supply means having first fluid lines connected respectively to opposite ends of the first actuator for selectively extending and retracting the driven member; second fluid lines selectively connectible in series between the two actuators to operate the two actuators in unison and selectively disconnectible from at least one actuator; and by-pass means for by-passing the first actuator when the second fluid lines are connected so as to supply fluid pressure to the second actuator while the first actuator is immobilized in said third condition.

18. In a tractor-implement outfit including a pair of force-receivable parts, mechanism for transmitting force to said parts, comprising: housing means supported on the tractor and containing first and second fore-and-aft hydraulic cylinders mounted closely parallel to each other and respectively having first and second pistons; a transverse rockshaft journaled in said housing means and connected to the first piston and further having a portion exposed exteriorly of said housing means; means for connecting said portion to one of said parts to transmit force thereto; a fore-and-aft swingable arm mounted on and exteriorly of the housing means and rearwardly of the rockshaft; force-transmitting means for connecting said arm to another of said parts; means operatively interconnecting the arm and the second piston; a fluid pressure source; and means connected to said source for transmitting fluid pressure to said cylinders, including first and second fluid lines connected respectively to said first and second cylinders and first and second valves respectively in and for controlling said first and second fluid lines.

19. In tractor-implement outfit including a pair of force-receivable parts, mechanism for transmitting force to said parts, comprising: housing means supported on the tractor and containing first and second fore-and-aft hydraulic cylinders respectively having first and second pistons; a first piston rod connected to the first piston and extending forwardly from the first cylinder; a transverse rockshaft journaled in the housing means ahead of the first cylinder and connected to the first piston rod and further having a portion exposed exteriorly of said housing means; means for connecting said portion to one of said parts to transmit force thereto; a second piston rod connected to the second piston and extending rearwardly from the second cylinder and exteriorly of the housing means; a fore-and-aft swingable arm mounted on and exteriorly of the housing means and rearwardly of the rockshaft; force-transmitting means for connecting said arm to another of said parts; means operatively interconnecting the arm and the second piston rod; a fluid pressure source; and means connected to said source for transmitting fluid pressure to said cylinders, including first and second fluid lines connected respectively to said first and second cylinders and first and second valves respectively in and for controlling said first and second fluid lines.

20. In tractor-implement outfit including a pair of force-receivable parts, mechanism for transmitting force to said parts, comprising: housing means supported on the tractor and containing first and second fore-and-aft hydraulic cylinders respectively having first and second pistons; a first piston rod connected to the first piston and extending forwardly from the first cylinder; a transverse rockshaft journaled in the housing means ahead of the first cylinder and connected to the first piston rod and further having a portion exposed exteriorly of said housing means; means for connecting said portion to one of said parts to transmit force thereto; a second piston rod connected to the second piston and extending rearwardly from the second cylinder and exteriorly of the housing means; means rearwardly of the housing means and connected to the second piston rod for transmitting force to another of said parts; a fluid pressure source; and means connected to said source for transmitting fluid pressure to said cylinders, including first and second fluid lines connected respectively to said first and second cylinders and first and second valves respectively in and for controlling said first and second fluid lines.

21. For a tractor-implement outfit in which the tractor has rear hitch means including vertically movable draft links pivotally connectible on a transverse axis to the implement and the implement has a top link extending to the tractor; power-operated mechanism on the tractor comprising housing means containing a first cylinder having a piston and a second fore-and-aft cylinder having a piston; a transverse rockshaft journaled in the housing means and connected to the first piston; lift means interconnecting the rockshaft and the draft links; a fore-and-aft movable adjusting member on the tractor rearwardly of the second cylinder and having means for connection to the top link; means connecting said member to the second piston for incurring fore-and-aft adjustment of the implement via said top link and about the axis of connection of the implement to the draft links; a fluid pressure source; and means connected to said source for transmitting fluid pressure to said cylinders, including first and second fluid lines connected respectively to said first and second cylinders and first and second valves respectively in and for controlling said first and second fluid lines.

22. The invention defined in claim 21, including: means for releasably locking said member against movement so as to immobilize the top link against fore-and-aft movement.

23. The invention defined in claim 22, in which: the connecting means between said member and the second piston rod is detachable to enable operation of the second cylinder and piston while the member is locked by said locking means.

24. The invention defined in claim 23, in which: the connecting means comprises a link having articulate connections to the member and second piston, said connection to the member is detachable to enable movement of the second piston and link relative to the locked member, and said member includes means for temporarily supporting the member-detached link.

25. In a tractor-implement outfit having a part adjustable relative to the tractor, mechanism for adjusting said part, comprising: an adjusting member connected to said part; means mounting said member on the tractor for movement back and forth; power-operated means on the tractor including a driving member movable back and forth; connection means between the members for incurring movement of the adjusting member by movement of the driving member, said connection means being detachable to free the members from each other so that the driving member may move back and forth independently of the adjusting member; and means for selectively locking the adjusting member to the tractor.

26. The invention defined in claim 25 in which the connection means includes a portion remaining with the driving member when said connection means is detached; and means is provided on the driven member for temporarily supporting the connection means portion during movement of the driving member independently of the driven adjusting member.

27. In tractor-implement outfit in which the implement has a force-receiving part, mechanism for transmitting force to said part, comprising: a driven member mounted on the tractor for movement back and forth and having means affording a force-transmitting connection to said part; a fluid-pressure-operated actuator on the tractor and including a reciprocable driving member; connecting means interconnecting said members for effecting movement of said members in unison in a first operating condition to adjust said part, said connecting means being detachable to enable selective operation of the actuator independently of the driven member in a second operating condition; and means for selectively locking the driven member against movement in said second operating condition so as to hold the position of said part, said locking means being also operative to lock the driven member while the connecting means is connected between the two members so as to hold both members and thus to immobilize the part and the actuator in a third operating condition.

References Cited in the file of this patent
UNITED STATES PATENTS

| | | |
|---|---|---|
| 2,455,727 | Bunting | Dec. 7, 1948 |
| 2,678,596 | Todd | May 18, 1954 |
| 2,755,721 | Rusconi | July 24, 1956 |